US010837296B2

(12) United States Patent
Park

(10) Patent No.: US 10,837,296 B2
(45) Date of Patent: Nov. 17, 2020

(54) AIR-COLLECTING STRUCTURE FOR ENHANCING COOLING PERFORMANCE FOR TRANSITION PIECE AND GAS TURBINE COMBUSTOR HAVING SAME

(71) Applicant: DOOSAN HEAVY INDUSTRIES & CONSTRUCTION CO., LTD., Changwon-si (KR)

(72) Inventor: Sung Wan Park, Busan (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 115 days.

(21) Appl. No.: 16/026,021

(22) Filed: Jul. 2, 2018

(65) Prior Publication Data
US 2019/0071985 A1 Mar. 7, 2019

(30) Foreign Application Priority Data
Sep. 6, 2017 (KR) .......................... 10-2017-0113878

(51) Int. Cl.
F01D 9/00 (2006.01)
F01D 9/02 (2006.01)
(Continued)

(52) U.S. Cl.
CPC ................ F01D 9/023 (2013.01); F02C 7/18 (2013.01); F23M 5/085 (2013.01); F23R 3/002 (2013.01);
(Continued)

(58) Field of Classification Search
CPC .. F01D 9/023; F23R 3/002; F23R 3/04; F23R 3/045; F23R 3/06; F23R 2900/03041;
(Continued)

(56) References Cited

U.S. PATENT DOCUMENTS 2,841,958 A * 7/1958 Stokes .................. F23R 3/04
60/759
3,581,492 A * 6/1971 Norgren .................. F23R 3/06
60/804
(Continued)

FOREIGN PATENT DOCUMENTS

JP 09-053823 A 2/1997
KR 10-2002-0039220 A 5/2002

Primary Examiner — Todd E Manahan
Assistant Examiner — Edwin Kang
(74) Attorney, Agent, or Firm — Invenstone Patent, LLC

(57) ABSTRACT

An air-collecting structure effectively cools a transition piece of a duct assembly in a gas turbine combustor. The structure includes a flow sleeve having a plurality of cooling holes and surrounding the transition piece, the cooling holes formed in a lateral side of the flow sleeve to receive a compressed cooling air and arranged in rows running parallel to each other in a longitudinal direction of the flow sleeve, the rows progressing up the lateral side from a lower row to a higher row; and a plurality of scoops arranged in correspondence with predetermined cooling holes among the plurality of cooling holes and configured to collect an amount of air according to row. Each scoop includes an inlet having a predetermined radius for collecting the compressed cooling air. The radius is constant for the scoops of any one row and increases from the lower row to the higher row.

13 Claims, 10 Drawing Sheets

(51) Int. Cl.
*F23R 3/04* (2006.01)
*F02C 7/18* (2006.01)
*F23M 5/08* (2006.01)
*F23R 3/00* (2006.01)

(52) U.S. Cl.
CPC .......... *F23R 3/04* (2013.01); *F05D 2250/241* (2013.01); *F05D 2260/202* (2013.01); *F23R 2900/03042* (2013.01)

(58) Field of Classification Search
CPC .. F23R 2900/03042; F23R 2900/03043; F23R 2900/03044; F05D 2240/35; F05D 2250/241; F05D 2260/201; F05D 2260/202

See application file for complete search history.

(56) References Cited

U.S. PATENT DOCUMENTS

| | | | | |
|---|---|---|---|---|
| 5,050,385 A | * | 9/1991 | Hirose | B23K 9/046 60/752 |
| 6,494,044 B1 | * | 12/2002 | Bland | F01D 9/023 60/772 |
| 8,151,570 B2 | * | 4/2012 | Jennings | F01D 9/023 60/752 |
| 2014/0290257 A1 | * | 10/2014 | Okita | F23R 3/002 60/752 |

* cited by examiner

AIR-COLLECTING STRUCTURE FOR ENHANCING COOLING PERFORMANCE FOR TRANSITION PIECE AND GAS TURBINE COMBUSTOR HAVING SAME

CROSS REFERENCE TO RELATED APPLICATION(S)

This application claims the benefit of Korean Patent Application No. 10-2017-0113878, filed on Sep. 6, 2017, which is hereby incorporated by reference in its entirety into this application.

BACKGROUND OF THE INVENTION

Field of the Invention

The present invention relates generally to a gas turbine and, more particularly, to a flow sleeve structure for improving film cooling performance for a duct assembly provided in a gas turbine combustor.

Description of the Related Art

Generally, a gas turbine combustor is provided between a compressor and a turbine so as to mix the compressed air from the compressor with fuel, combust the air-fuel mixture at constant pressure to produce combustion gases with high energy, and transmit the combustion gases to the turbine, which in turn converts heat energy of the combustion gases into mechanical energy.

Such combustors include a duct assembly which has a transition piece coming into direct contact with hot combustion gases, a flow sleeve surrounding the transition piece, and the like. Since the transition piece should be properly cooled, a portion of compressed air supplied from the compressor is directed towards an inner annular space of the flow sleeve through cooling holes and air-collecting parts (scoops) of the flow sleeve to cool the transition piece.

However, in a conventional arrangement of cooling holes and air-collecting parts of the flow sleeve, an amount of compressed cooling air laterally introduced from the flow sleeve gradually decreases as the compressed air flows upstream. In addition, even when attempts are undertaken to increase the collected amount of compressed air by using air-collecting parts, the amount of compressed air reaching the air-collecting parts on the upper side is essentially smaller than that reaching the air-collecting parts on the lower side, resulting in the transition piece, particularly its upper side (H in FIG. 3), being continuously subjected to high temperature-related stress, thereby reducing the efficiency of cooling the entire duct assembly.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an object of the present invention is to provide an air-collecting structure on a flow sleeve for improving cooling performance for a transition piece, through which hot combustion gas passes, in a duct assembly of a gas turbine combustor.

Another object of the present invention is to provide an air-collecting structure on a flow sleeve in a duct assembly of a gas turbine combustor for effectively supplying a compressed cooling air to an upper side of a transition piece having a relatively poor film-cooling efficiency.

In order to achieve the above objects, according to one aspect of the present invention, there is provided an air-collecting structure for cooling a transition piece of a duct assembly in a gas turbine combustor. The air-collecting structure may include a flow sleeve having a plurality of cooling holes and surrounding the transition piece, the cooling holes formed in a lateral side of the flow sleeve to receive a compressed cooling air and arranged in rows running parallel to each other in a longitudinal direction of the flow sleeve, the rows progressing up the lateral side from a lower row to a higher row; and a plurality of scoops arranged in correspondence with predetermined cooling holes among the plurality of cooling holes and configured to collect an amount of air according to row.

Each scoop may include an inlet for collecting the compressed cooling air, the inlet having a predetermined radius. The predetermined radius may be constant for the scoops of any one row, and the predetermined radius of a row of scoops increases from the lower row to the higher row and may increase from an nth row to an (n+1)th row.

The inlet may be formed by a curved base, attached to the lateral side of the flow sleeve, and a cover formed of a concave surface extending from the curved base. The concave surface may be open toward an inflow direction of the compressed cooling air, and the curved base may be disposed opposite to the inflow direction.

The scoops may be arranged alternately in a vertical direction between an nth row and an (n+1)th row, where n is a natural number. The scoops may be arranged alternately in a vertical direction between the (n+1)th row and an (n+2)th row, and wherein the scoops in the (n+2)th row are vertically collinear with the scoops in the nth row. The scoops may have a repeated arrangement pattern wherein the scoops in adjacent n and (n+1)th rows have the same inlet radius, and an inlet radius of the scoops in the (n+2)th row may be larger than that of the scoops in the adjacent n and (n+1)th rows. The inlet radius of the scoops in the (n+1)th row may be larger than a distance between the scoops in the nth row.

The inlet radius of the scoop is substantially the same as a height of the scoop protruding from the lateral side.

The cooling holes provided in the lateral side may be arranged such that the cooling holes are disposed alternately in a vertical direction between an nth row and an (n+1)th row.

The cooling holes may be longitudinally disposed in the lateral side in rows such that the cooling holes of any row are vertically aligned with the cooling holes of another row, and the scoop arrangement may exhibit a vertical alignment whereby the scoops in an nth row alternate in alignment with the scoops in an (n+1)th row, which in turn alternate with the scoops in an (n+2)th row, such that the scoops in the (n+2)th row are vertically collinear with the scoops in the nth row.

Each scoop may have a quadrant-spherical shape and may be disposed to surround substantially one half of the circumference of a cooling hole.

According to other aspects of the present invention, there is provided a duct assembly for a gas turbine combustor, as well as a gas turbine combustor including the duct assembly. The duct assembly may include the above air-collecting structure.

According to the present invention, the provision of the air-collecting structure on the flow sleeve in the duct assembly of a gas turbine combustor has an effect of increasing a supply of compressed cooling air to a space of a double-wall structure defined by the flow sleeve and the transition piece, thereby improving the efficiency of cooling the transition piece.

Further, the provision of the air-collecting structure of the flow sleeve in the duct assembly of a gas turbine combustor has an effect of maximizing a supply of compressed cooling air to the hot front side of the transition piece, to which a supply of compressed cooling air is insufficient, thereby improving the efficiency of film-cooling the transition piece.

The effects of the invention are not limited to the above effects, and other effects will be apparent to those skilled in the art from the flowing description.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
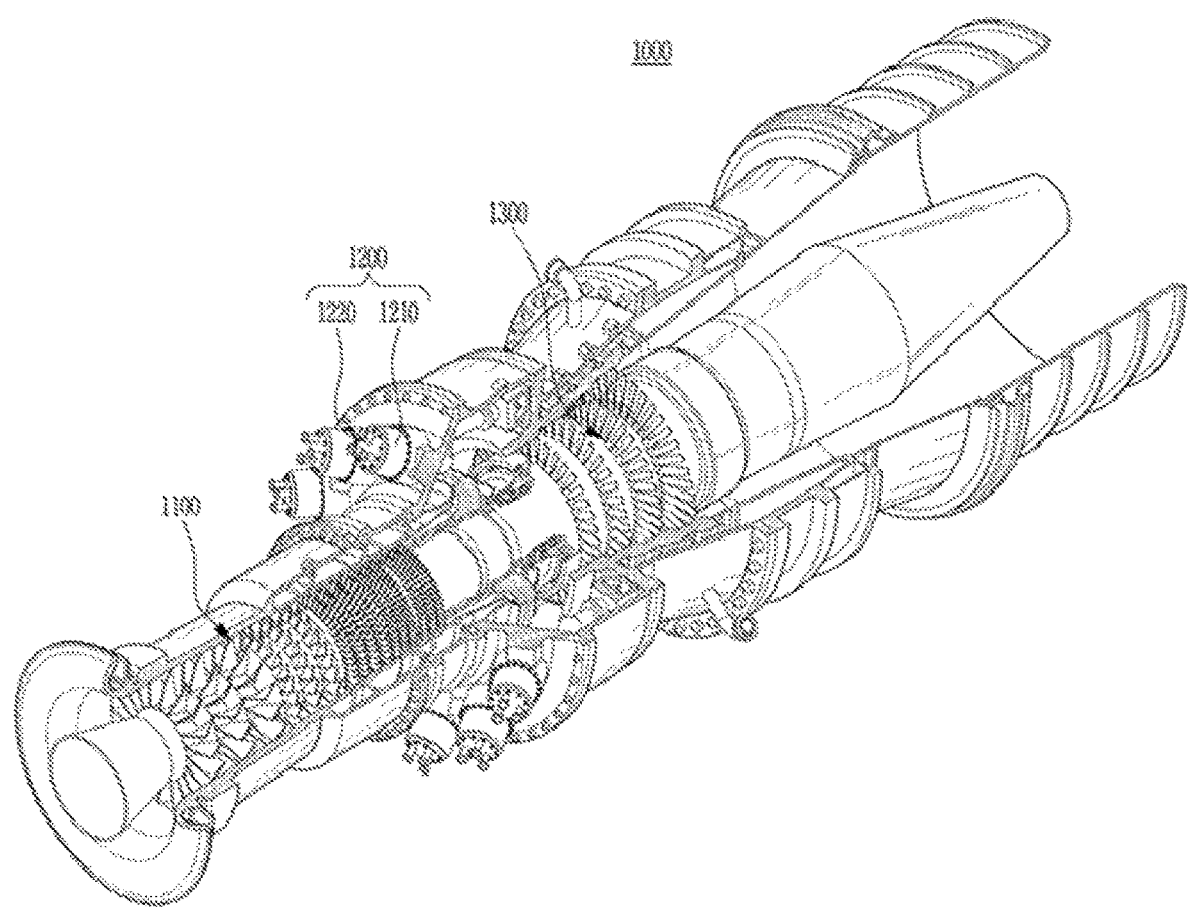
FIG. 1 is a cutaway perspective view of the overall structure of a gas turbine.

Preferred embodiments of the present invention will now be described in detail with reference to the accompanying drawings.

In the following description, it is to be noted that, when the functions of conventional elements and the detailed description of elements related with the present invention may make the gist of the present invention unclear, a detailed description of those elements will be omitted. Wherever possible, the same reference numerals will be used throughout the drawings and the description to refer to the same or like parts. When referring to the drawings, it should be understood that the shape and size of the elements shown in the drawings may be exaggeratedly drawn to provide an easily understood description of the structure of the present invention.

It should be understood that, although the terms first and second, A and B, (a) and (b), etc. may be used herein to describe various elements of embodiments of the present invention, the terms are only used to distinguish one element from another element, and thus do not limit a feature, order, etc. of the element. In addition, it should be understood that terms concerning attachments, coupling and the like, such as "connected" and "coupled" refer to a relationship wherein structures are secured or attached to one another either directly or indirectly through intervening structures.

An ideal thermodynamic cycle of a gas turbine follows a Brayton cycle. The Brayton cycle consists of four thermodynamic processes: an isentropic compression (adiabatic compression), an isobaric combustion, an isentropic expansion (adiabatic expansion) and isobaric heat ejection. That is, in the Brayton cycle, atmospheric air is sucked and compressed into high pressure air, mixed gas of fuel and compressed air is combusted at constant pressure to discharge heat energy, heat energy of hot expanded combustion gas is converted into kinetic energy, and exhaust gases containing remaining heat energy is discharged to the outside. That is, gases undergo four thermodynamic processes: compression, heating, expansion, and heat ejection.

A gas turbine for realizing the Brayton cycle includes a compressor, combustor, and a turbine. FIG. 1 illustrates an entire construction of the gas turbine 1000. Although the present invention will be described with reference to FIG. 1, the present invention may be widely applied to other similar turbine engines to the gas turbine 1000 shown in FIG. 1.

The compressor 1100 of the gas turbine 1000 is a unit that sucks and compresses air. The compressor mainly serves both to supply the compressed air for combustion to a combustor 1200 and to supply the compressed air for cooling to a high temperature region of the gas turbine 1000. Since the sucked air undergoes an adiabatic compression process in the compressor 1100, the air passing through the compressor 1100 has increased pressure and temperature. The compressor 1100 in such a large-scale gas turbine 1000 as shown in FIG. 1 is a multi-stage axial compressor that compresses a great amount of air to a target compression ratio through multiple stages.

Figure 2:
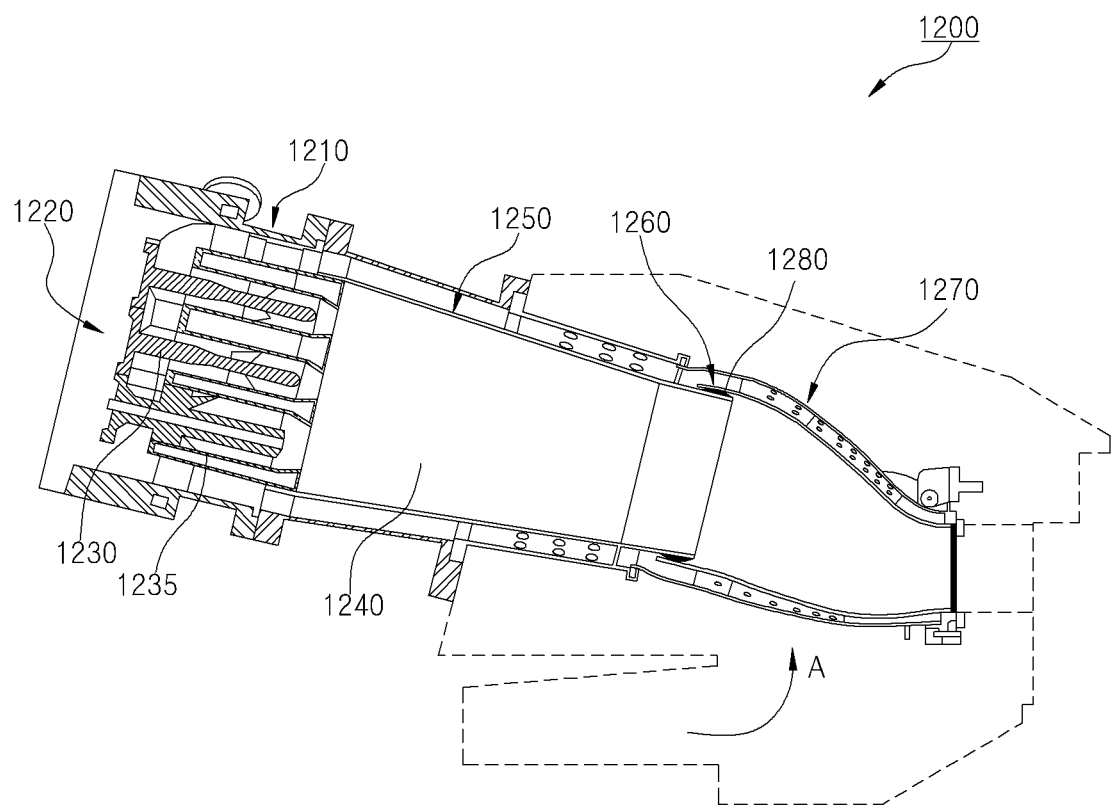
FIG. 2 is a cross-sectional view of a gas turbine combustor, into which a compressed cooling air is being introduced.

The combustor 1200 mixes the compressed air supplied from an outlet of the compressor 1100 with fuel and combust the mixture at constant pressure to produce hot combustion gases. FIG. 2 illustrates an example of the combustor 1200 provided in the gas turbine 1000. The combustor 1200 is disposed downstream of the compressor 1100 and a plurality of burners 1220 is disposed along an inner circumference of a combustor casing 1210. The burners 1220 each have several combustion nozzles 1230, through which fuel is sprayed into and mixed with air in a proper ratio to form a fuel-air mixture suitable for combustion.

The gas turbine 1000 may use gas fuel, liquid fuel, or a combination thereof. In order to create a combustion environment for reducing emissions such as carbon monoxides, nitrogen oxides, etc. as a target of regulation, a gas turbine has a recent tendency to apply premixed combustion that is advantageous in reducing emissions through lowered combustion temperature and homogeneous combustion despite its relatively difficult combustion control.

In premixed combustion, after compressed air is previously mixed with fuel sprayed from the combustion nozzles 1230, the mixture is supplied to a combustion chamber 1240. When the premixed gas is initially ignited by an igniter and then the combustion state is stabilized, the combustion state is maintained by supplying fuel and air.

Since the combustor 1200 is the highest temperature environment in the gas turbine 1000, the combustor needs suitable cooling. Particularly, turbine inlet temperature (TIT) is an important factor in the gas turbine 1000, since the higher TIT is, the greater the operating efficiency of the gas turbine 100 is. Further, as TIT increases, it is advantageous to gas turbine combined power generation. Thus, TIT is also used as a reference to determine classes (grades) of a gas turbine 1000.

Since temperature of combustion gas should be increased in order to increase TIT, it is important to design the combustion chamber 1240 and a duct assembly having a cooling path both to have high heat resistance and to be easily cooled.

Referring to FIG. 2, the duct assembly includes a liner 1250, the transition piece 1260, and the flow sleeve 1270 and is provided to connect the turbine 1300 and a section of combustor 1200 occupied by the burners 1220, such that the duct assembly heated by hot combustion gas is properly cooled while the hot combustion gas flows towards the combustion nozzles 1230 along an outer surface of the duct assembly.

The duct assembly has a double-wall structure in which the flow sleeve 1270 surrounds the liner 1250 and the transition piece 1260, which are connected by means of an elastic support 1280 (FIG. 3), wherein compressed air is introduced into an inner annular space of the flow sleeve 1270 to cool the liner 1250 and the transition piece 1260.

The liner 1250 is a tube member connected to the burner section of the combustor 1200, wherein an internal space of the liner 1250 defines the combustion chamber 1240. The transition piece 1260, which is connected to the liner 1250, is connected to an inlet of the turbine 1300 to guide the hot combustion gas towards the turbine 1300. The flow sleeve 1270 serves both to protect the liner 1250 and the transition piece 1260 and to prevent high temperature heat from being discharged directly to the outside.

Particularly, since the liner 1250 and the transition piece 1260 come into direct contact with the hot combustion gas, they should be properly cooled. To this end, the liner 1250 and the transition piece 1260 are protected from the hot combustion gas through a film-cooling method using the compressed air. For example, as illustrated in FIG. 2, for effective film-cooling, a complex double-wall structure may also be employed in order to introduce the compressed air directly to inner circumferential surfaces of the liner 1250 and the transition piece 1260.

Since front and rear ends of the liner 1250 and the transition piece 1260 are fastened to the combustor 200 and turbine 1300 sides, respectively, the elastic support 1280 needs to support the liner 1250 and the transition piece 1260 with a structure capable of accommodating longitudinal and radial extension due to heat expansion.

High temperature, high pressure combustion gas generated by the combustor 1200 is supplied to the turbine 1300 through the duct assembly. In the turbine 1300, the combustion gas undergoes adiabatic expansion and impacts and drives a plurality of blades arranged radially around a rotary shaft so that heat energy of the combustion gas is converted into mechanical energy with which the rotary shaft rotates. A portion of the mechanical energy obtained from the turbine 1300 is supplied as the energy required to compress the air in the compressor, and the rest is utilized as an available energy to drive a generator to produce electric power.

Since the gas turbine 1000 has no major components such as mutually frictional parts and thus does not perform a reciprocating motion, the gas turbine has advantages in that lubricant consumption is very low, amplitude of a driving motion in the gas turbine is reduced, and high speed motion is possible.

Since heat efficiency in the Brayton cycle increases as compression ratio of air increases and turbine inlet temperature (TIT) of the combustion gas introduced during isoentropic expansion increases, the gas turbine 1000 is being directed to an increase in the compression ratio and TIT.

Arrangements of a plurality of scoops 300 according to an embodiment of the present invention will now be described with reference to FIGS. 2 to 10. The scoops 300 serve as part of an air-collecting structure provided in the duct assembly in a compressor 1200 of a gas turbine 1000 for improving cooling performance for the transition piece 1260. Hereinafter, scoop arrangement refers to a specific arrangement of scoops as applied to the flow sleeve of the duct assembly. Scoop arrangement is inclusive of scoop size and disposition relative to a corresponding cooling hole.

Figure 3:
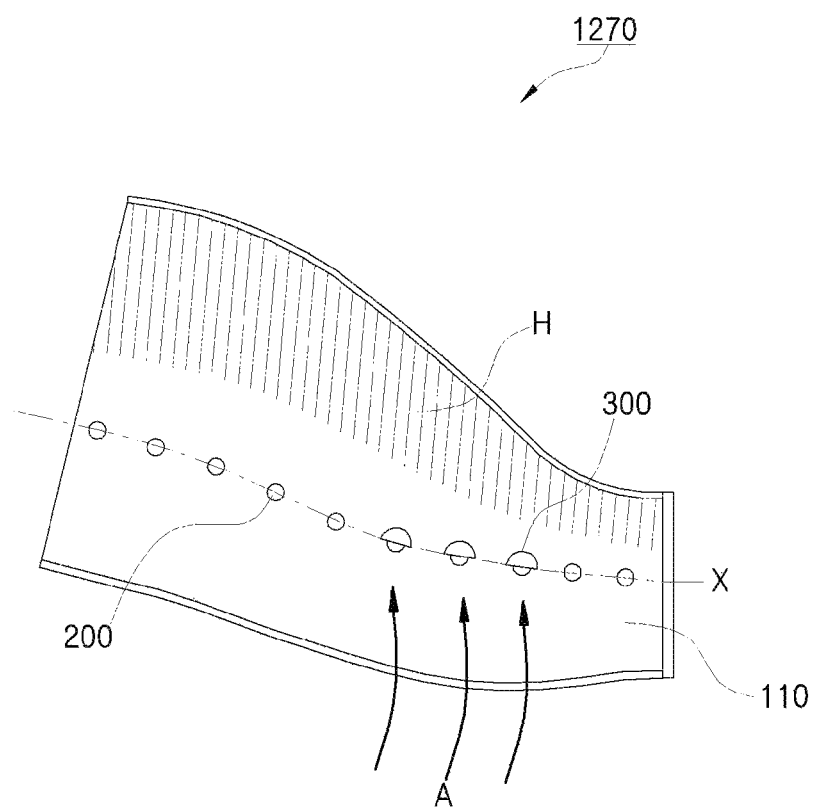
FIG. 3 is a side view of a transition piece of FIG. 2, illustrating an inflow of a compressed cooling air into a flow sleeve of a duct assembly in the combustor.

FIG. 2 illustrates an inflow of a compressed cooling air A into the combustor 1200 of the gas turbine from the compressor 1100, and FIG. 3 illustrates a flow sleeve 1270 of the duct assembly into which the compressed air A is being introduced.

The scoop arrangement of the duct assembly is applied to a lateral side 110 (110a, 110b) of a double-wall structure of the duct assembly, which includes the transition piece 1260 and the flow sleeve 1270, to cool the duct assembly heated by the hot combustion gas. That is, lateral sides 110a and 110b of the flow sleeve 1270 surrounding the transition piece 1260 are provided with a plurality of cooling holes 200, and a scoop arrangement is defined when some portion, or all, of the cooling holes 200 are provided with scoops. The scoops 300 are disposed on the lateral side 110 in correspondence to the cooling holes 200 of at least two rows X, which run parallel to each other in the longitudinal direction of the flow sleeve 1270, thereby forming the scoop arrangement. The rows of cooling holes 200 progress up the lateral side 110, from a lower row to a higher row, with FIG. 3 showing one such row X conceptually.

Thus, a portion of compressed air A discharged from the compressor 1100 of the gas turbine 1000 approaches the flow sleeve 1270 radially from a central shaft (rotor shaft) (i.e. in the direction from the bottom side in FIG. 2) in order to cool the duct assembly, particularly the transition piece 1260 behind (underneath) the flow sleeve 1270, which is heated by hot combustion gas. Such compressed air A needs to be introduced to the transition piece 1260, not only through cooling holes 200 provided in a bottom side 120 of the flow sleeve 1270, but also through those in the lateral side 110 (in a direction indicated by arrow in FIG. 3) of the flow sleeve 1270. This flow of compressed air is particularly needed for cooling lateral and upper sides (110a, 110b, 130) of the transition piece 1260.

However, in a conventional arrangement of cooling holes of the flow sleeve, an amount of compressed cooling air A laterally introduced through the cooling holes 200 in the lateral side 110 of the flow sleeve 1270 gradually decreases as the compressed air flows in an upper direction of the combustor 1200, compared to the amount of compressed air through the bottom side 120 of the flow sleeve. In addition, even when attempts are undertaken to increase the collected amount of compressed air by using air-collecting scoops 300, there is a diminishing supply of compressed air reaching the lateral side 110 and the upper side 130, such that the air available for cooling gradually becomes less and less for each succeeding row of cooling holes 200. That is, the amount of compressed air A reaching rows of scoops on the upper side is essentially reduced by the amount of compressed air collected by rows of scoops on the lower side, resulting in the transition piece 1260, particularly an upper side thereof (H in FIG. 3), being continuously subjected to higher temperatures, thereby reducing the efficiency of cooling the entire transition piece.

To solve this problem, the present invention proposes a scoop arrangement on the flow sleeve 1270 for improving cooling performance of the transition piece 1260, wherein the scoops 300 are respectively arranged next to each of at least some portion of the cooling holes 200 and are arranged in a configuration to address the problem of diminishing air supply. Here, the improved and effective scoop arrangement can be proposed by the present invention without significantly changing a basic structure/formation and/or a number of conventional arrangement of cooling holes and scoops. Also, the scoop arrangement of the present invention is applied to a predetermined set of cooling holes 200 among the plurality of cooling holes 200, and the predetermined cooling holes may include all the cooling holes 200. In any event, the cooling holes 200 to which a scoop arrangement of the present invention is applied may be provided to the flow sleeve 1270 according to a known configuration of cooling holes for film-cooling the transition piece 1260, to include cooling holes having a conventional number, shape, size, etc. Thus, the plurality of scoops 300 are arranged in correspondence with predetermined cooling holes among the plurality of cooling holes 200, which are arranged in rows, and the scoop arrangement is configured to collect an amount of air according to row.

The scoop arrangement will be described as follows.

Figure 4:
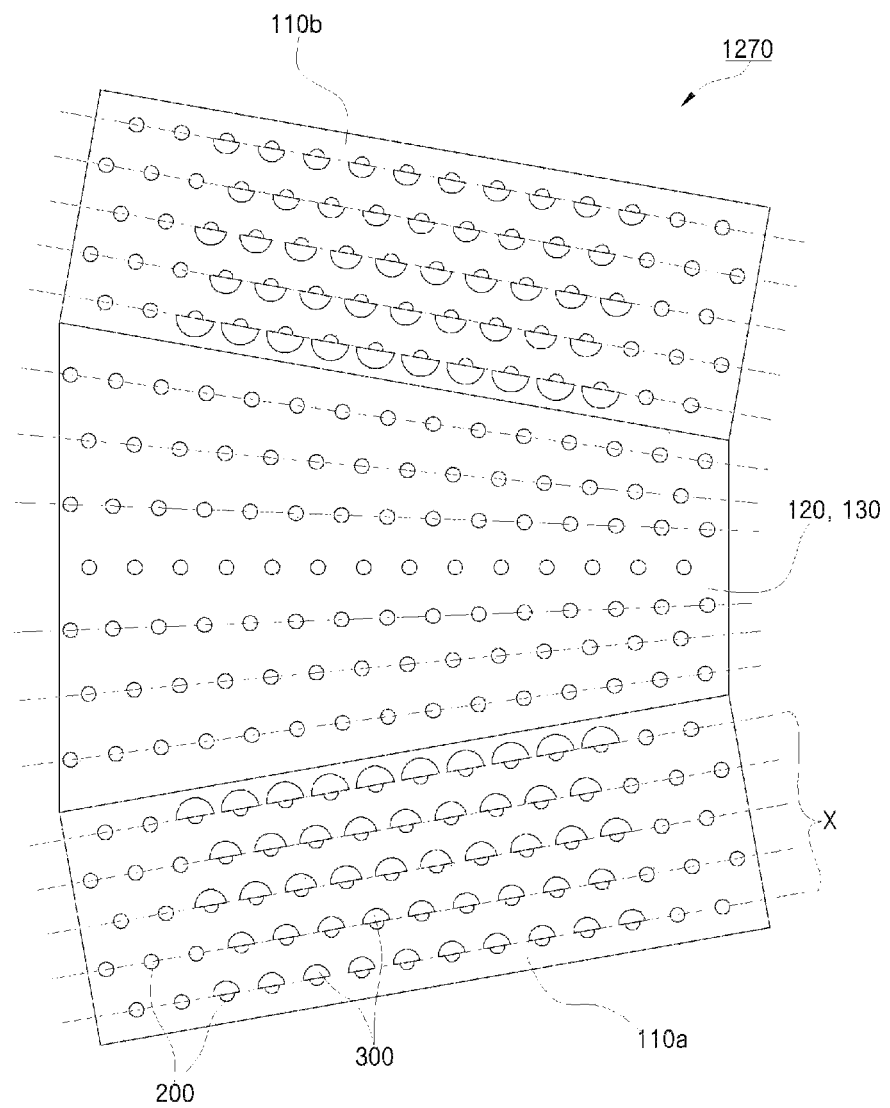
FIG. 4 is an exploded plan view of a flow sleeve to which a scoop arrangement for improving the efficiency of cooling the transition piece is applied according to an embodiment of the present invention.

FIG. 4 shows a flow sleeve to which a scoop arrangement for improving the efficiency of cooling the transition piece is applied according to an embodiment of the present invention.

Figure 7A:
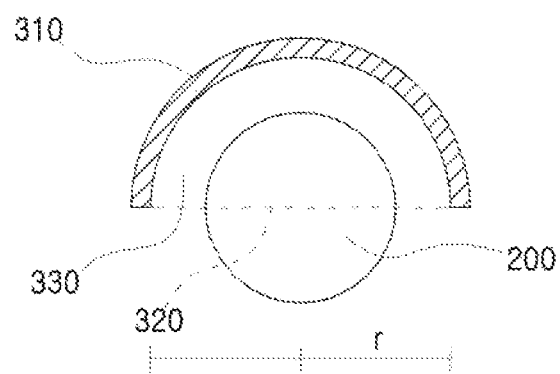
FIGS. 7A and 7B are top and side cross-sectional views, respectively, of a scoop shown in FIG. 5 or FIG. 6.
Figure 7B:
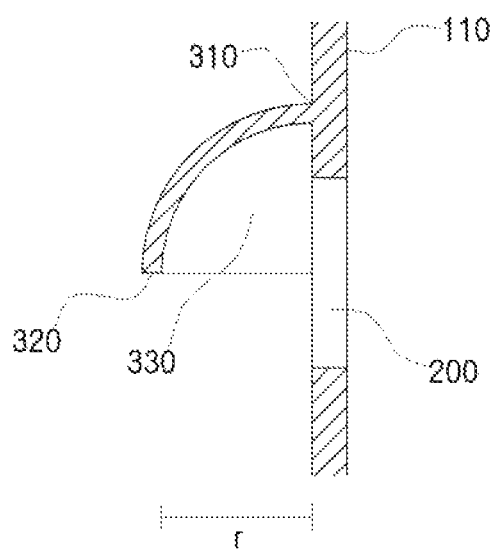

Referring to FIG. 4, the scoop arrangement is provided such that rows of scoops 300 on opposite lateral sides 110a and 110b have inlet radii r, which is shown in FIGS. 7A and 7B, that increase from a lowest row to a highest row.

The relative nature of the rows is described herein considering the arrangement of cooling holes 200 being formed on the lateral side 110 so as to receive a flow of cooling air that is generally perpendicular with respect to the axis of the duct assembly. Thus, herein, a lower row is a row disposed closer to the upstream side of the cooling air passing over the flow sleeve 1270, and a higher row is a row disposed closer to the downstream side of the cooling air passing over the flow sleeve 1270, which translates into the horizontal and vertical arrangement of scoops as shown in FIGS. 5, 6, 8, and 10. In each instance, the lowest row is vertically situated on the bottom, and the highest row is vertically situated on the top.

Since the bottom side 120 and the upper side 130 of the flow sleeve 1270 are substantially perpendicular to an inflow direction of compressed cooling air A, neither particularly requires an air-collecting part such as a scoop 300. However, if the inflow direction of the compressed air changes according to the configuration of a duct assembly having the transition piece 1260 and the flow sleeve 1270, another side (e.g., the bottom side 120 and/or the upper side 130) may be alternatively provided with the scoops 300 accordingly, so that the scoops are similarly disposed in rows for radial cooling of a hot area of the transition piece 1260 according to the scoop arrangement of the present invention.

Figure 5:
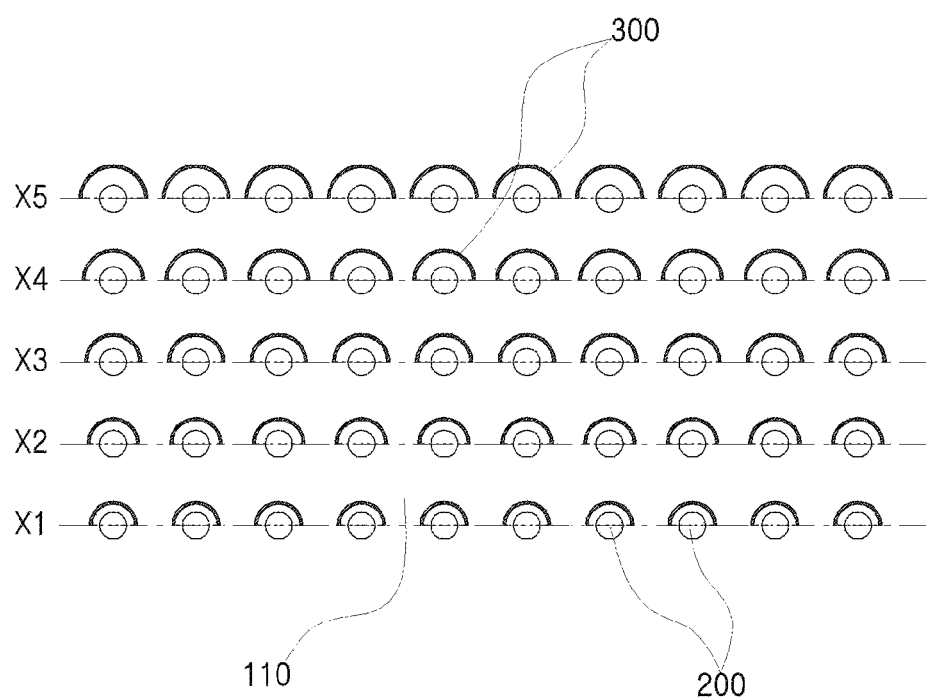
FIG. 5 is a conceptual view of a lateral side of the flow sleeve to which a scoop arrangement for improving the efficiency of cooling the transition piece is applied according to an embodiment of the present invention.
Figure 6:
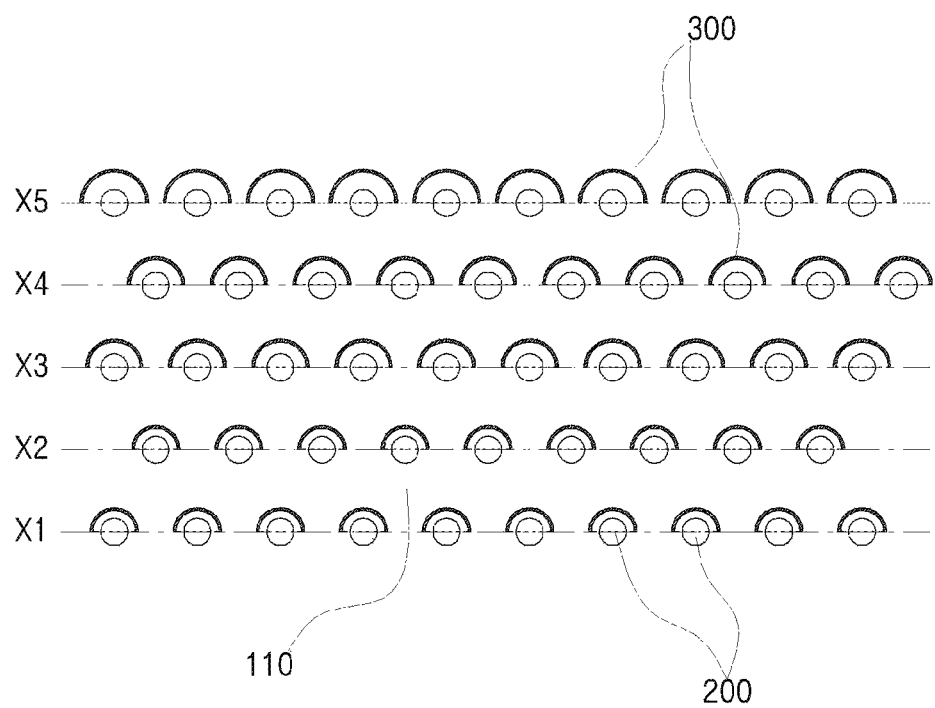
FIG. 6 is a conceptual view of a lateral side of the flow sleeve to which a scoop arrangement for improving the efficiency of cooling the transition piece is applied according to another embodiment of the present invention.

FIG. 5 conceptually illustrates a lateral side 110 of the flow sleeve to which a scoop arrangement for improving the efficiency of cooling the transition piece 1260 is applied according to an embodiment of the present invention. FIG. 6 shows a scoop arrangement according to another embodiment of the present invention.

According to these embodiments, the scoops may be longitudinally arranged on the lateral side 110 in five rows. In FIGS. 5 and 6, an arrangement of the scoops includes first to fifth rows x1 to x5 of scoops from the bottom to the top of the lateral side 110.

Here, according to the present invention, where n is a natural number, the scoops disposed along an (n+1)th row may have an inlet radius r that is larger than that of the scoops disposed along an nth row. Thus, in this embodiment of five rows, n is 1, 2, 3, or 4.

Specifically, in the embodiment of FIG. 5, when a plurality of cooling holes 200 are longitudinally disposed on the lateral side 110 in rows such that the cooling holes 200 of any row are vertically aligned with the cooling holes of another row. For example, when the cooling holes of an nth row and the cooling holes of an (n+1)th row are respectively arranged along the same vertical reference lines, the scoops 300 disposed around the cooling holes 200 in rows may have an inlet radius that increases from a lowest row to a highest row.

Alternatively, in the embodiment of FIG. 6, the cooling holes 200 are longitudinally disposed in rows such that the cooling holes 200 of successive rows are disposed in a vertically alternating manner of alignment. Thus, the corresponding rows of scoops may be arranged such that, for example, where n is a natural number, the scoops in an nth row and the scoops in an (n+1)th row are disposed so as to alternate their vertical alignment. In this embodiment, n is 1, 2, or 3. In other words, the scoop arrangement may exhibit a vertical alignment whereby the scoops 300 in an nth row alternate in alignment with the scoops in an (n+1)th row, which in turn alternate with the scoops in an (n+2)th row, such that the scoops in the (n+2)th row are vertically collinear with the scoops in the nth row.

In the embodiment of FIG. 6, although the scoops are generally arranged such that an inlet radius r of the scoops in rows increases from a lowest row to a highest row, the scoops in two adjacent rows have the same inlet radius. Specifically, the scoops in the nth and (n+1)th rows may have the same inlet radius, whereas the scoops in the (n+2)th row may have an inlet radius that is larger than that of the scoops in the nth row.

For example, the scoops 300 are provided such that an inlet radius r1 of the scoops 300 in a first row X1 is the same as an inlet radius r2 of the scoops 300 in a second row X2 and such that an inlet radius r3 of the scoops 300 in a third row X3 is larger than the inlet radius r1 of the scoops in the first row X1. Following this pattern, an inlet radius of the scoops increases from the third row to a fifth row.

The configuration concerning an inlet radius of the scoops 300 in first to fifth rows will be described in detail with reference to FIGS. 7A and 7B illustrating the scoops 300.

Referring to FIGS. 7A and 7B, the scoop 300 includes an inlet 330 for collecting compress cooling air, and the inlet 330, which has a predetermined radius r, is formed by a curved base 310 and a cover 320. The curved base 310 is attached to the lateral side 110 of the flow sleeve 1270, and the cover 320 is formed of a concave surface extending from the curved base 310. The concave surface of the cover 320 is open toward an inflow direction of the compressed cooling air, and the curved base 310 is disposed opposite to the inflow direction. Thus, the inlet 330 serves as an air-collecting means directed towards the inflow direction of the compressed cooling air A. Preferably, the scoops 300 are disposed to surround substantially one half of the circumference of the cooling holes 200, and the inlet radius r of the scoop 300 may have a substantially same value as a length of the scoop 300 protruding from the lateral side 110.

The scoop 300 may have any shape, so long as it is a physical object having an inlet radius r for collection of a compressed cooling air A into the cooling hole 200 in the lateral side 110. Thus, the scoop 300 is not limited to a quadrant-spherical scoop in this embodiment, but may include a scoop 300 which has a whole or partial curved surface of the quadrant-spherical scoop of the embodiment with an opening extended vertically from the lateral side 110.

Figure 8:
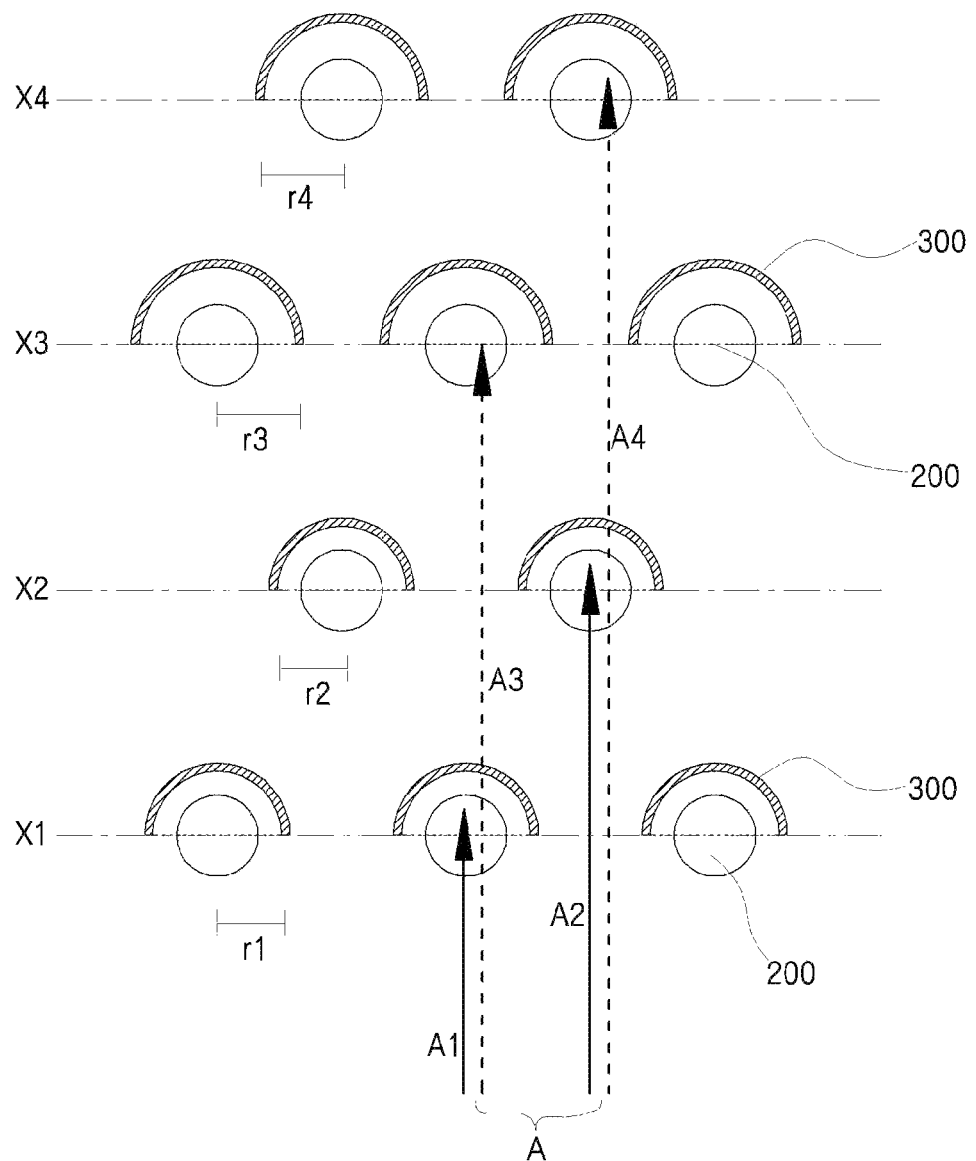
FIG. 8 is a conceptual view of a lateral side of the flow sleeve to which the scoop arrangement of FIG. 6 is applied.
Figure 9:
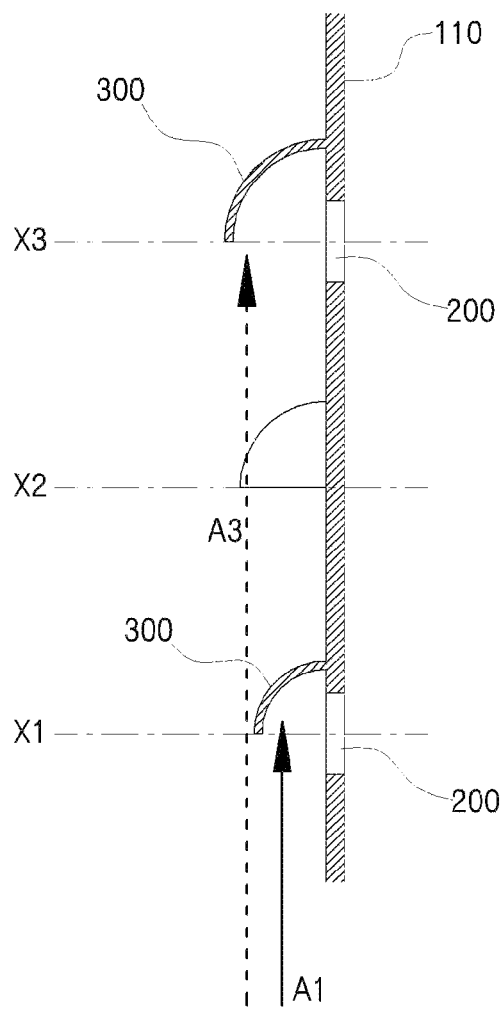
FIG. 9 is a side view of a portion the scoop arrangement of FIG. 8, for illustrating a supply effect of a compressed cooling air.

FIGS. 8 and 9 are top and side views of a scoop arrangement for illustrating a supply effect of a compressed cooling air A.

Referring to FIGS. 8 and 9, the scoops are provided such that the inlet radius r of the scoops in an (n+1)th row is larger than the inlet radius r of the scoops in an nth row. This configuration maximizes a supply of compressed cooling air introduced into a double-wall structure defined by the transition piece 1260 and the flow sleeve 1270 through the cooling holes 200 in a highest row or higher rows.

Accordingly, this configuration can improve cooling performance of a duct assembly for cooling a gas turbine combustor 1200 particularly by homogeneously supplying a compressed air around the upper or highest side of the transition piece 1260 to improve the efficiency of cooling the transition piece.

Specifically, referring to the embodiment of FIG. 8, a portion of compressed air A supplied from a lower side (or a central shaft of a rotor) flows around a lower side of a space in the transition piece 1260 in a double-wall structure of a duct assembly (see A1 and A2 in FIG. 8) with a supply of compressed air determined depending on the inlet radii r1 and r2 of the scoops 300 in first and second rows X1 and X2, and a remaining upstream compressed air is collected by the scoops 300 in third and fourth rows X3 and X4, which have an increased inlet radius, and then flows around an upper side of the space in the transition piece in the double-wall structure (see A3 and A4 in FIG. 8).

Here, the inlet radius r1 of the scoops 300 in the second row is larger than a distance between the scoops 300 in the first row, so that the scoops can more effectively collect the compressed air A1 and A2 flowing around adjacent rows.

Like this, the scoop arrangement according to the present invention arranges the scoops on the lateral side of the flow sleeve 1270 in rows such that an inlet radius r of the scoops 300 in respective rows increases from the lower row to the higher row, to increase a supply of compressed air to a hot area of upper or top part of the transition piece 1260.

As described above, the present invention focuses on an arrangement of the scoops, rather than an arrangement of the cooling holes 200 around which the scoops 300 are disposed. Further, since there is no need to dispose the scoops 300 around all of the cooling holes 200, the scoops 300 can be only provided around some of the cooling holes 200 provided in the lateral side 110 into a specified scoop arrangement.

Figure 10:
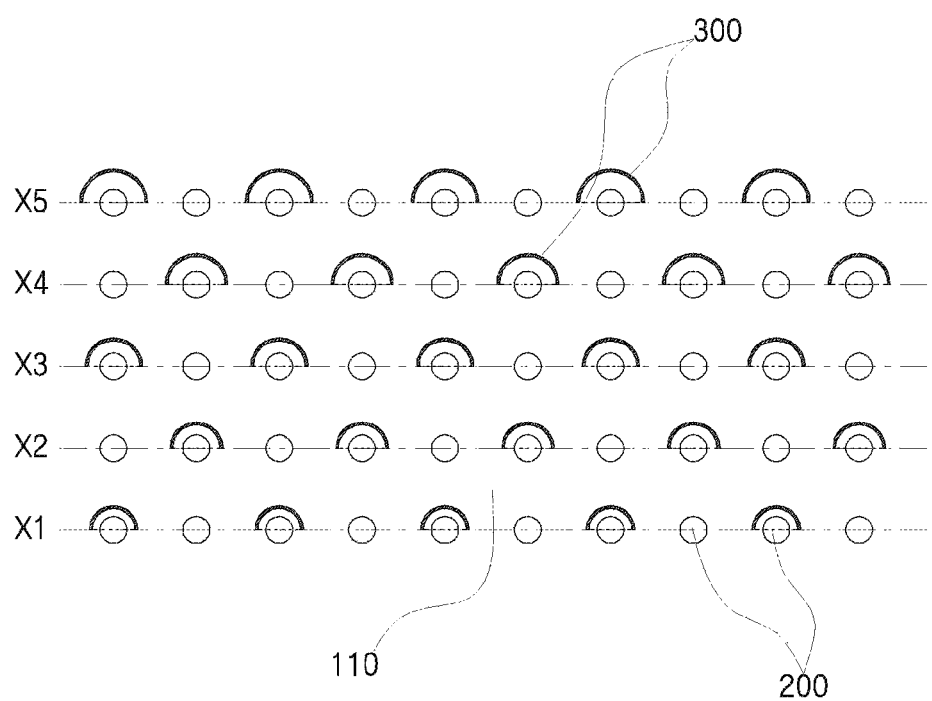
FIG. 10 is a conceptual view of a lateral side of the flow sleeve to which a scoop arrangement for improving the efficiency of cooling the transition piece is applied according to a further embodiment of the present invention.

FIG. 10 shows a lateral side 110 of the flow sleeve to which such a scoop arrangement is applied according to an embodiment of the present invention.

Referring to FIG. 10, cooling holes 200 are arranged vertically and horizontally in the same manner in as FIG. 5, and scoops 300 in respective rows are alternately disposed around the cooling holes 200 in respective rows in such a manner that the scoops 300 in an nth row vertically alternate with the scoops 300 in an (n+1)th row, which also vertically alternate with the scoops in an (n+2)th row such that the scoops in the (n+2)th row are vertically collinear with the scoops in the nth row.

At the same time, the scoops in the nth and (n+1)th rows may have the same inlet radius, whereas the scoops in the (n+2)th row may have an inlet radius that is larger than that of the scoops in the nth row.

According to the present invention, the provision of the scoop arrangement of the flow sleeve 1260 in the duct assembly of a gas turbine combustor 1200 has an effect of increasing a supply of compressed cooling air to a space of a double-wall structure defined by the flow sleeve and the transition piece, thereby improving the efficiency of cooling the transition piece.

Furthermore, the provision of the scoop arrangement of the flow sleeve in the duct assembly of a gas turbine combustor has an effect of maximizing a supply of compressed cooling air to the hot upper side of the transition piece, to which a supply of compressed cooling air is insufficient, thereby improving the efficiency of cooling the entire duct assembly.

In the foregoing, the scoop arrangement for improving the efficiency of cooling the transition piece and the gas turbine combustor including the same have been described. It will be understood that those skilled in the art can implement the technical configurations of the invention into other specific forms without changing the technical scope or essential features of the invention.

Therefore, the above-mentioned embodiments are provided for illustrative purposes in all aspects and should not be construed as limiting the invention.

What is claimed is:

1. An air-collecting structure for cooling a transition piece of a duct assembly in a gas turbine combustor, the air-collecting structure comprising:
    a flow sleeve having a plurality of cooling holes and surrounding the transition piece, the cooling holes formed in a lateral side of the flow sleeve to receive a compressed cooling air and arranged in rows running parallel to each other in a longitudinal direction of the flow sleeve, the rows progressing up the lateral side from a lower row to a higher row; and
    a plurality of scoops arranged in correspondence with predetermined cooling holes among the plurality of cooling holes, each of the plurality of scoops arranged in the rows and configured to collect an amount of the compressed cooling air according to a respective row of the rows,
    wherein each of the plurality of scoops is aligned on the rows and spaced apart between the rows,
    each of the plurality of scoops comprises an inlet for collecting the compressed cooling air, the inlet having an inlet radius,
    the inlet radius of a first row of the plurality of scoops being larger than a second row of the plurality of scoops, the first row aligned on the higher row, the higher row being arranged on an upper portion of the lateral side, the second row aligned on the lower row, and the lower row being arranged on a bottom portion of the lateral side, and each scoop of the plurality of scoop has a quadrant-spherical shape and is disposed to surround substantially one half of a circumference of a respective cooling hole of the plurality of cooling holes.

2. The air-collecting structure according to claim 1, wherein the inlet radius is constant for the plurality of scoops of any one row of the rows.

3. The air-collecting structure according to claim 2, wherein the inlet radius of the plurality of scoops increases from the lower row to the higher row.

4. The air-collecting structure according to claim 1, wherein the inlet is formed by a curved base, attached to the lateral side of the flow sleeve, and a cover formed of a concave surface extending from the curved base.

5. The air-collecting structure according to claim 4, wherein the concave surface is open toward an inflow direction of the compressed cooling air, and the curved base is disposed opposite to the inflow direction.

6. The air-collecting structure according to claim 1, wherein the plurality of scoops are arranged alternately in a vertical direction between an nth row of the rows and an (n+1)th row of the rows, where n is a natural number.

7. The air-collecting structure according to claim 6, wherein the plurality of scoops are arranged alternately in a vertical direction between the (n+1)th row and an (n+2)th row of the rows, and wherein the plurality of scoops in the (n+2)th row are vertically collinear with the plurality of scoops in the nth row.

8. The air-collecting structure according to claim 7, wherein the plurality of scoops have a repeated arrangement pattern wherein the inlet radius of the plurality of scoops in the nth row and the (n+1)th row are the same, and the inlet radius of the of the plurality of scoops in the (n+2)th row and an (n+3)th row of the rows are the same and larger than the inlet radius of the plurality of scoops in the nth row and the (n+1)th row.

9. The air-collecting structure according to claim 8, wherein the inlet radius of the plurality of scoops in the (n+1)th row is larger than a distance between adjacent scoops of the plurality of scoops in the nth row.

10. The air-collecting structure according to claim 1, wherein the inlet radius of a respective scoop of the plurality of scoops is substantially the same as a height of the respective scoop protruding from the lateral side.

11. The air-collecting structure according to claim 1, wherein the plurality of cooling holes provided in the lateral side are arranged such that the plurality of cooling holes are disposed alternately in a vertical direction between an nth row of the rows and an (n+1)th row of the rows, where n is a natural number.

12. The air-collecting structure according to claim 1, wherein the plurality of cooling holes are longitudinally disposed in the lateral side in the rows such that the plurality of cooling holes of any row of the rows are vertically aligned with the plurality of cooling holes of another row of the rows, and wherein a scoop arrangement exhibits a vertical alignment whereby the plurality of scoops in an nth row of the rows alternate in alignment with the plurality of scoops in an (n+1)th row of the rows, which in turn alternate with the plurality of scoops in an (n+2)th row of the rows, such that the plurality of scoops in the (n+2)th row are vertically collinear with the plurality of scoops in the nth row, where n is a natural number.

13. A gas turbine combustor including a duct assembly, the duct assembly comprising:

an air-collecting structure for cooling a transition piece of the duct assembly in the gas turbine combustor, the air-collecting structure comprising:

a flow sleeve having a plurality of cooling holes and surrounding the transition piece, the cooling holes formed in a lateral side of the flow sleeve to receive a compressed cooling air and arranged in rows running parallel to each other in a longitudinal direction of the flow sleeve, the rows progressing up the lateral side from a lower row to a higher row; and a plurality of scoops arranged in correspondence with predetermined cooling holes among the plurality of cooling holes, each of the plurality of scoops arranged in the rows and configured to collect an amount of the compressed cooling air according to a respective row:

wherein each of the plurality of scoops is aligned on the rows and spaced apart between the rows, each of the plurality of scoops comprises an inlet for collecting the compressed cooling air, the inlet having an inlet radius, the inlet radius of a first row of the plurality of scoops being larger than a second row of the plurality of scoops, the first row aligned on the higher row, the higher row being arranged on an upper portion of the lateral side, and the second row aligned on the lower row, and the lower row being arranged on a bottom portion of the lateral side, and each scoop of the plurality of scoop has a quadrant-spherical shape and is disposed to surround substantially one half of a circumference of a respective cooling hole of the plurality of cooling holes.

* * * * *